July 19, 1960     E. JAUERNIK     2,945,949
METHOD AND ARRANGEMENT FOR PRODUCING ELECTRIC ADVANCE IMPULSES
Filed Dec. 12, 1957
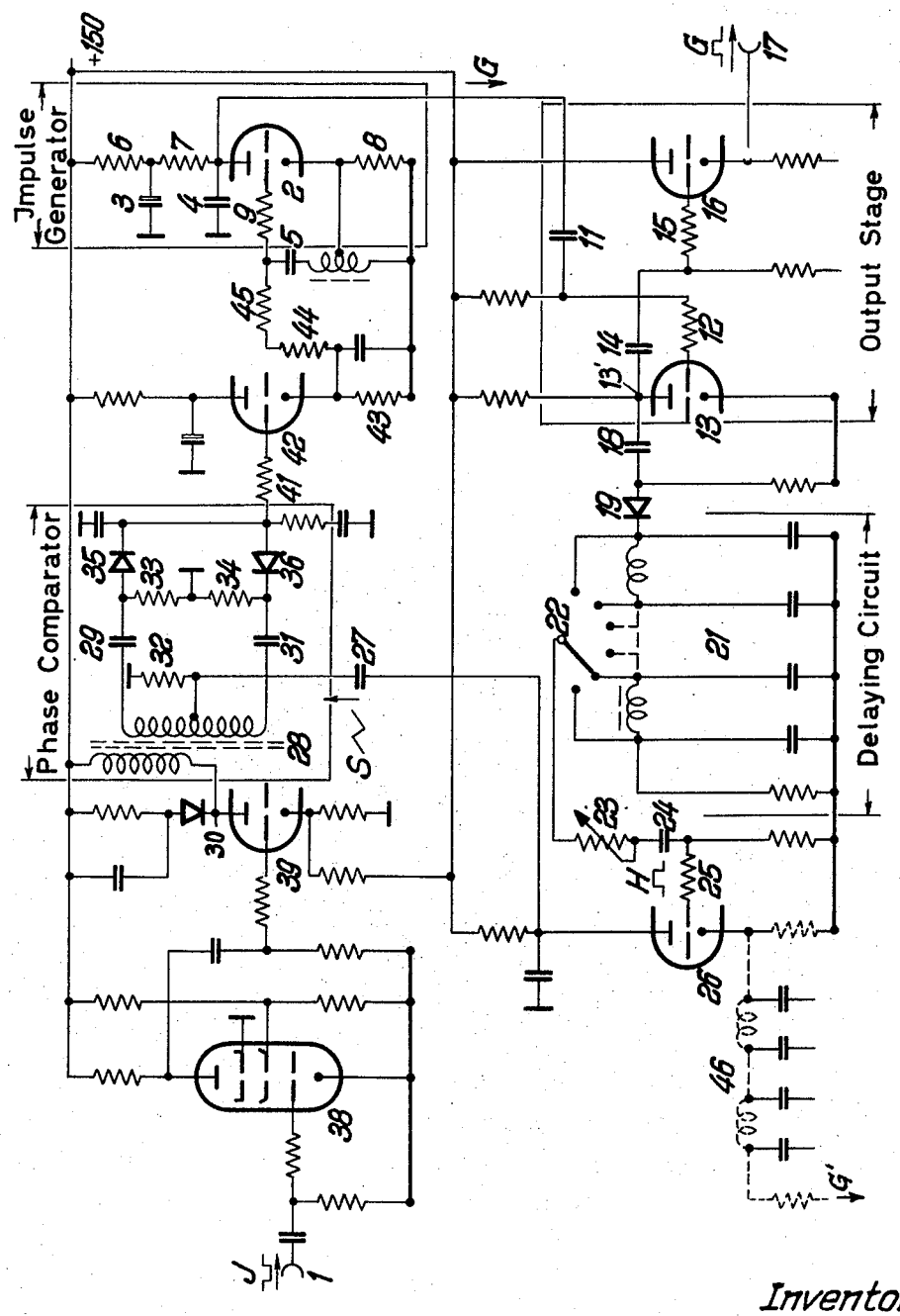
*Inventor:*
Edmund Jauernik
by Michael S. Striker
Attorney

United States Patent Office 2,945,949
Patented July 19, 1960

2,945,949
METHOD AND ARRANGEMENT FOR PRODUCING ELECTRIC ADVANCE IMPULSES

Edmund Jauernik, Darmstadt, Germany, assignor to Fernseh G.m.b.H., Darmstadt, Germany Filed Dec. 12, 1957, Ser. No. 702,333

Claims priority, application Germany Dec. 14, 1956

9 Claims. (Cl. 250—27)

The present invention refers to methods and arrangements for producing special sequences of electric impulses, and more specifically for producing advance impulses related to a sequence of primary impulses.

It is intended to use hereinafter the term "advance impulses" for such impulses whose leading slopes are shifted or offset with respect to the leading slopes of a sequence of primary impulses by an amount $t$ of lead time.

There are known methods for producing such advance impulses. However, operating in accordance with those known methods entails the serious disadvantage that the lead time obtained is subject to very substantial variations or fluctuations whenever the frequency of the primary impulses varies, while for the ultimate use of the desired advance impulses great stability and constancy are important.

It is therefore a main object of the present invention to provide a method that would eliminate the disadvantages of the known methods and yield satisfactory results in an efficient manner.

It is another object of the invention to provide an arrangement which is particularly well suited for carrying out the new method and is yet composed of only a small number of reliable and uncomplicated components.

Further objects will become apparent from the following description of a preferred embodiment of the method and arrangement according to the invention.

With the above objects in view, the method according to the invention mainly comprises the steps of producing in an impulse generator a sequence of generated impulses at a pulse frequency identical with that of a sequence of primary impulses, deriving from the generated impulses a sequence of auxiliary impulses having a pulse frequency identical with that of the generated impulses, but being subject to an adjustable phase shift relative thereto, transmitting the primary impulses and the auxiliary impulses to a phase comparator for comparing the respective phases with each other and for obtaining from any appearing phase difference, a control voltage, and injecting this control voltage into the impulse generator for regulating the frequency of the latter so as to cause the sequence of generated impulses to be the advance impulses leading the primary impulses by a desired amount of lead time.

In another aspect of the invention, an arrangement for producing advance impulses comprises, in combination, an input section having input and output terminals and including at least a forming stage, for receiving the input of a sequence of primary impulses; a phase comparator means having a first input terminal connected to the output of the input section, and an output terminal, and a second input terminal, the phase comparator being adapted to compare the phase of the primary impulses with that of any sequence of impulses introduced through the second input terminal thereof and to obtain from any appearing phase difference between these sequences of impulses a control voltage; an impulse generator having an input terminal connected in circuit with the output of the phase comparator and operating at a pulse frequency identical with that of the sequence of primary impulses so as to furnish generated impulses at this pulse frequency, the phase relation of the generated impulses relative to the primary impulses depending upon the control voltage supplied by the phase comparator, the impulse generator further including an output stage having a first output terminal for delivering the generated impulses, and a second output terminal, a delaying circuit means having an input terminal connected with the second output terminal of the impulse generator, and an output terminal, for shifting the phase of the generated impulses furnished by the impulse generator, and transmitter means for transmitting the generated impulses after their passing through the delaying circuit means with their original frequency but subject to a predetermined amount of phase shift, to the second input terminal of the phase comparator, whereby the sequence of generated impulses delivered from the first output terminal of the impulse generator are made the desired advance impulses leading the primary impulses by an amount of lead time depending upon the amount of phase shift determined by the characteristics of the delaying circuit means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing, which is a circuit diagram illustrating a preferred form of the method according to the invention, and at the same time illustrating a preferred embodiment of the arrangement according to the invention.

Before going into a description of the method and arrangement as illustrated, it should be noted that one of the great advantages of the invention resides in the fact that the advance impulses obtained thereby as well as the auxiliary impulses have very steep slopes so that the desired advance impulses are produced with utmost accuracy and precision. Another important advantage of the invention is the great constancy and stability of the ultimately obtained lead time of the advance impulses, even if the primary impulse frequency should vary.

It has been found to be most advantageous to use as an impulse generator a blocking oscillator, and to produce the auxiliary impulse out of the generated impulse by means of delaying circuit means adapted to maintain their performance constant in time, as for instance adjustable delaying chain combinations. In this connection it should be noted that where similar delaying circuit means have been used in known methods, the amount of delay applied is only slightly smaller than the length of time of a single period or cycle of the primary sequence of impulses (in which case the ensuing difference between the time of the cycle and the delay equals the lead time $t$). On the other hand, according to the invention the amount of delay is equal to the lead time $t$. Therefore, in the case of frequency variations of the primary impulse sequence only very minute changes of the lead time can occur. Experiments with an embodiment of the invention have shown that when the frequency of the sequence of primary impulses was varied 10%, i.e. from 47 to 52 c./sec., the lead time changed only 1%.

Moreover, preferably the auxiliary impulses are converted by conventional means into a saw-tooth voltage before being compared with the primary impulses in the phase comparator.

Also, in a particularly successful embodiment of the invention it was found advantageous to inject the control voltage that is fed by the phase comparator into the impulse generator for regulating its operating frequency, from the output of the phase comparator by means adapted to do this against low resistance.

Referring now to the drawing at the input terminal 1 a sequence of primary impulses J is introduced, relative to which a sequence of advance impulses having a lead time $t$ are to be produced. A number of components described further below are connected between the input terminal 1 and an impulse generator which comprises the tube 2, condensers 3, 4, 5, resistors 6, 7, 8, 9 and is otherwise of conventional type. In this impulse generator a sequence of generated impulses G is produced. These generated impulses G are delivered via an output stage comprising the condenser 11, the resistor 12 and a tube system 13 to the first output terminal 17, the impulses G being actually applied to the grid of the tube system 13 so that the impulses can be picked up via the condenser 14 and impressed via grid resistor 15 on the control grid of the tube 16 from the cathode of which the impulses G reach the terminal 17.

At the same time, the generated impulses G coming from the impulse generator, as shown, are branched off at the second output terminal 13' and transmitted via condenser 18 and rectifier 19 to a delaying chain combination 21 of conventional type, which is provided with a selector switch 22 for adjusting the delay produced by the chain 21. After passing the chain 21 the impulses G appear as auxiliary impulses H having the same pulse frequency as the primary and the generated impulses J and G, respectively, but are subject to a phase shift determined by the delay caused by the chain 21 depending upon the setting of the switch 22. The auxiliary impulses H are passed on to the tube 26 via resistor 23, condenser 24 and grid resistor 25, and from the anode of tube 26 the auxiliary impulses are transmitted as saw-tooth impulses S to the second input terminal of a phase comparator circuit at the condenser 27, while the primary impulses are fed into the same phase comparator circuit from terminal 1 via an input stage at input terminal 30 as is described below.

The phase comparator circuit comprises a transformer 28, condensers 29 and 31, resistors 32, 33, 34 and diodes 35, 36 in conventional manner.

The above mentioned input stage comprises a forming stage 38 and another tube stage 39 and thus constitutes a circuit between input terminal 1 and the input of the phase comparator circuit.

It is evident that in the above mentioned phase comparator circuit the phases of the two sequences of impulses transmitted to it, namely the primary impulses J and the auxiliary or saw-tooth impulses S, respectively, are compared with each other and thus in case of appearance of any phase difference a corresponding control voltage is produced at the output side of the phase comparator circuit, and this control voltage is impressed via resistor 41 on the grid of the tube 42 which is connected to form a cathode stage so that said control voltage is transmitted against low resistance. In the same manner the control voltage required for the impulse generator is picked up from the cathode resistor 43 of the tube 42 and supplied to the grid of the tube 2 via resistors 44, 45 and 9 whereby the frequency of the generated impulses G is regulated in such a manner that the sequence of primary impulses J and the sequence of auxiliary impulses H have the same phase. When this condition is established, then the generated impulses G are shifted in phase relative to the primary impulses J by exactly an amount of time which is determined by the effect of the delaying chain 21. Thus, the generated impulses delivered at output terminal 17 constitute the desired advance impulses characterized by the desired lead time.

It may be noted that addition of the circuit elements 46, shown in dotted lines only, could be used for obtaining from the described arrangement, if desired, also lagging impulses G' related to the primary impulses J in an otherwise similar way as the advance impulses G.

It will be understood that each of the elements described above, or two or more together, may also find a useful application in other types of method and apparatus for producing electric impulses differing from the types described above.

While the invention has been illustrated and described as embodied in a method and apparatus for producing electric advance impulse related to primary impulses, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An arrangement for producing advance rectangular impulses related to a sequence of primary impulses, comprising, in combination, an input section having input and output terminals and including at least a forming stage, for receiving the input of said sequence of primary impulses; a phase comparator means having a first input terminal connected to said output of said input section, and an output terminal, and a second input terminal, said phase comparator being adapted to compare the phase of said primary rectangular impulses with that of any sequence of impulses introduced through said second input terminal and to obtain from any appearing phase difference between said sequences of impulses a control voltage; an impulse generator having an input terminal connected in circuit with the output of said phase comparator and operating at a pulse frequency identical with that of said sequence of primary rectangular impulses so as to furnish generated impulses at said pulse frequency, the phase relation of said generated impulses relative to said primary impulses depending upon said control voltage supplied by said phase comparator, said impulse generator further including an output stage having a first output terminal for delivering said generated impulses, and a second output terminal; a delaying circuit means having an input terminal connected with said second output terminal of said impulse generator, and an output terminal, for shifting the phase of said generated impulses furnished by said impulse generator, said delaying circuit means including an adjustable delaying chain combination adapted to adjust, depending upon operating conditions, the amount of phase shift produced by said delaying chain combination; and transmitter means for transmitting said generated impulses after their passing through said delaying circuit means with their original frequency but subject to a predetermined amount of phase shift to said second input terminal of said phase comparator, whereby the sequence of generated impulses delivered from the first output terminal of said impulse generator are made the desired advance impulses leading said primary impulses by an amount of lead time depending on the amount of phase shift determined by the characteristics of said delaying circuit means.

2. An arrangement as set forth in claim 1, wherein said impulse generator is of the free running oscillator type.

3. An arrangement as set forth in claim 1, wherein said impulse generator is of the blocking oscillator type.

4. An arrangement as set forth in claim 1, wherein said delaying circuit means are of a type adapted to maintain its performance as a constant function of time.

5. An arrangement as set forth in claim 4, wherein said transmitter means include means for transmitting said phase-delayed generated impulses to said phase comparator as auxiliary impulses of predetermined wave form.

6. An arrangement as set forth in claim 4, wherein said transmitter means include means for giving said auxiliary impulses saw-tooth form.

7. An arrangement as set forth in claim 1, wherein between said phase comparator and said impulse generator are connected coupling means adapted to inject said control voltage into said impulse generator against low resistance.

8. An arrangement as set forth in claim 7, wherein said coupling means include an electron tube having a grid and a cathode circuit including a cathode resistance, said grid being connected to receive said control voltage, and said cathode circuit being connected to apply the voltage drop appearing at said cathode resistance, to said impulse generator for regulating the output frequency of the latter.

9. An arrangement as set forth in claim 6, wherein between said phase comparator and said impulse generator are connected coupling means adapted to inject said control voltage into said impulse generator against low resistance, and wherein said coupling means include an electron tube having a grid and a cathode circuit including a cathode resistance, said grid being connected to receive said control voltage, and said cathode circuit being connected to apply the voltage drop appearing at said cathode resistance, to said impulse generator for regulating the output frequency of the latter.

References Cited in the file of this patent
UNITED STATES PATENTS

| | | |
|---|---|---|
| 2,529,666 | Sands | Nov. 14, 1950 |
| 2,793,347 | Clark | May 21, 1957 |